US 8,290,037 B2

United States Patent
Liu et al.

(10) Patent No.: US 8,290,037 B2
(45) Date of Patent: Oct. 16, 2012

(54) FEEDBACK ASSISTED TRANSMISSION OF MULTIPLE DESCRIPTION, FORWARD ERROR CORRECTION CODED, STREAMS IN A PEER-TO-PEER VIDEO SYSTEM

(75) Inventors: Zhengye Liu, Brooklyn, NY (US); Shivendra S. Panwar, Freehold, NJ (US); Keith W. Ross, New York, NY (US); Yanming Shen, Brooklyn, NY (US); Yao Wang, Livingston, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 1086 days.

(21) Appl. No.: 12/145,675

(22) Filed: Jun. 25, 2008

(65) Prior Publication Data
US 2009/0034614 A1   Feb. 5, 2009

Related U.S. Application Data (60) Provisional application No. 60/937,808, filed on Jun. 28, 2007.

(51) Int. Cl.
*H04N 7/12* (2006.01)
(52) U.S. Cl. .......... 375/240.02; 375/240.06; 375/240.27
(58) Field of Classification Search ........................ None
See application file for complete search history.

(56) References Cited

U.S. PATENT DOCUMENTS

| 2003/0220110 A1* | 11/2003 | Kizu et al. ..................... 455/445 |
| 2004/0143672 A1* | 7/2004 | Padmanabham et al. ..... 709/231 |
| 2006/0038116 A1* | 2/2006 | Okada ....................... 250/231.18 |
| 2007/0047650 A1* | 3/2007 | Vilei et al. ............... 375/240.16 |
| 2007/0071094 A1* | 3/2007 | Takeda et al. ............ 375/240.04 |
| 2007/0130359 A1* | 6/2007 | Amini et al. .................. 709/231 |
| 2007/0288980 A1* | 12/2007 | Niu et al. ...................... 725/123 |
| 2008/0151998 A1* | 6/2008 | He ............................ 375/240.16 |
| 2008/0260002 A1* | 10/2008 | Zhang et al. .................. 375/144 |
| 2009/0172763 A1* | 7/2009 | Liu ............................... 725/114 |

* cited by examiner

*Primary Examiner* — Andrew Lee
(74) *Attorney, Agent, or Firm* — Straub & Pokotylo; John C. Pokotylo (57) ABSTRACT

MD-FEC is considered an efficient way to generate a large number of descriptions. However, typically, MD-FEC introduces significant redundancy across streams. MD-FEC encoded streams (descriptions) are adapted based on feedback. Specifically, the bits sent in each description by a supplying peer are adapted based on the number of available descriptions in its receiving peer. The adaptive delivery eliminates unnecessary bits in the original MD-FEC streams (descriptions), and significantly reduces the consumed uplink bandwidth at supplying peers. The saved bandwidth can be used to accommodate more video sessions or for other applications.

20 Claims, 9 Drawing Sheets

FEEDBACK ASSISTED TRANSMISSION OF MULTIPLE DESCRIPTION, FORWARD ERROR CORRECTION CODED, STREAMS IN A PEER-TO-PEER VIDEO SYSTEM

§0.0 RELATED APPLICATIONS

Benefit is claimed to the filing date of U.S. Provisional Patent Application Ser. No. 60/937,808 ("the '808 provisional"), titled "FEEDBACK ASSISTED REDUNDANCY-FREE TRANSMISSION OF MD-FEC STREAMS IN P2P VIDEO," filed on Jun. 28, 2007 and listing Zhengye LIU, Shivendra S. PANWAR, Keith W. ROSS, Yanming SHEN and Yao WANG as inventors. The '808 provisional is incorporated herein by reference. However, the scope of the claimed invention is not limited by any requirements of any specific embodiments described in the '808 provisional.

§0.1 GOVERNMENT RIGHTS

The United States Government may have certain rights in this invention pursuant to a grant awarded by the National Science Foundation. Specifically, the United States Government has a paid-up license in this invention and the right in limited circumstances to require the patent owner to license others on reasonable terms as provided for by the terms of Contract or Grant No. 0435228 awarded by the National Science Foundation.

§1. BACKGROUND OF THE INVENTION

§1.1 Field of the Invention

The present invention concerns the efficient transmission of data. More specifically, the present invention concerns the transmission of peer-to-peer (P2P) video streams from multiple supplying peers, to a receiving peer where the video streams are combined and decoded.

§1.2 Related Art

Recently, P2P techniques have become a popular solution for large scale video live streaming and on-demand services. In the articles, V. N. Padmanabhan, H. J. Wang, P. A. Chou, and K. Sripanid-kulchai, "Distributing streaming media content using cooperative networking," *Proceedings of NOSSDAV*, 2002 (incorporated herein by reference), and X. Xu, Y. Wang, S. S. Panwar, and K. W. Ross, "A peer-to-peer video-on-demand system using multiple description coding and server diversity," *IEEE International Conference on Image Processing(ICIP)*, Oct. 2004 (incorporated herein by reference), multiple description forward error correction ("MD-FEC") technique has been employed to overcome peer failures which frequently occur in a P2P network. In the P2P scenario, a receiving peer streams multiple substreams (normally more than two) from different supplying peers. Due to a storage constraint or the lack of content during distribution, the supplying peers may not hold all substreams. When the substreams have nesting dependence, such as layered coding, the loss of one substream may affect the other substreams. On the other hand, with multiple description coding (MDC), each substream has the same importance, and when any one of the substreams becomes unavailable, the video quality is not severely degraded. Therefore, MDC is robust to a sudden peer disconnection.

Figure 1:
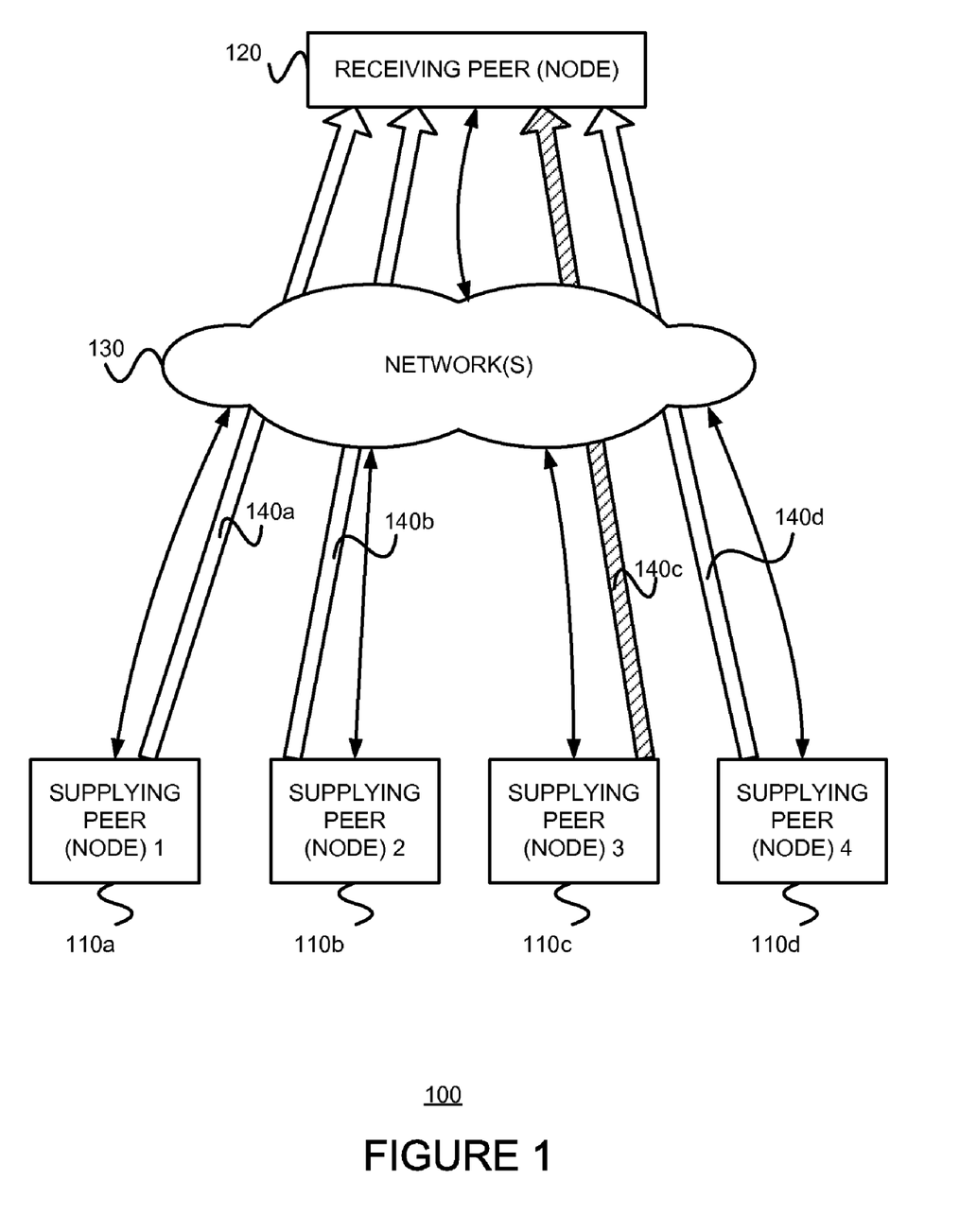
FIG. 1 illustrates an environment in which MDC is applied in P2P video streaming.

FIG. 1 illustrates an environment 100 in which MDC is applied in P2P video streaming. Supplying peers 110 provide separate descriptions (or substreams) 140 to the receiving peer 120 either via a direct communication or via one or more networks 130. By using MDC, failure of supplying peer 3 110c (or some other failure which prevents description 140c from reaching the receiving peer 120) does not affect the decoding of the other substreams 140a, 140b and 140d.

In the area of MDC, considerable work has been done for video transmitted over lossy networks. A review of MD video coding principles and techniques can be found in the article, Y. Wang, A. R. Reibman, and S. Lin, "Multiple description coding for video delivery," *Proceeding of the IEEE*, pp. 57-70 (January 2005) (incorporated herein by reference). Most of these solutions consider how to generate two descriptions efficiently. Multiple description forward error correction coding (MD-FEC), described in the article, R. Puri and K. Ramchandran, "Multiple description source coding through forward error correction codes," $33^{rd}$ *Asilomar Conf. Signals, Systems and Computers*, October 1999 (incorporated herein by reference), provides a popular scheme for multiple description coding that can generate a large number of descriptions. However, as described below, MD-FEC introduces significant redundancy across streams, even with an optimal layer partition as described in the Puri article. Consequently, when MD-FEC is used, the source coder requires a higher bit rate to reach the same target decoding quality as a single description codec. Consequently, in the absence of transmission loss, MD-FEC does not utilize transmission bandwidth efficiently. Therefore, it would be useful to use transmission bandwidth more efficiently, particularly when transmission loss is not an issue.

Figure 2:
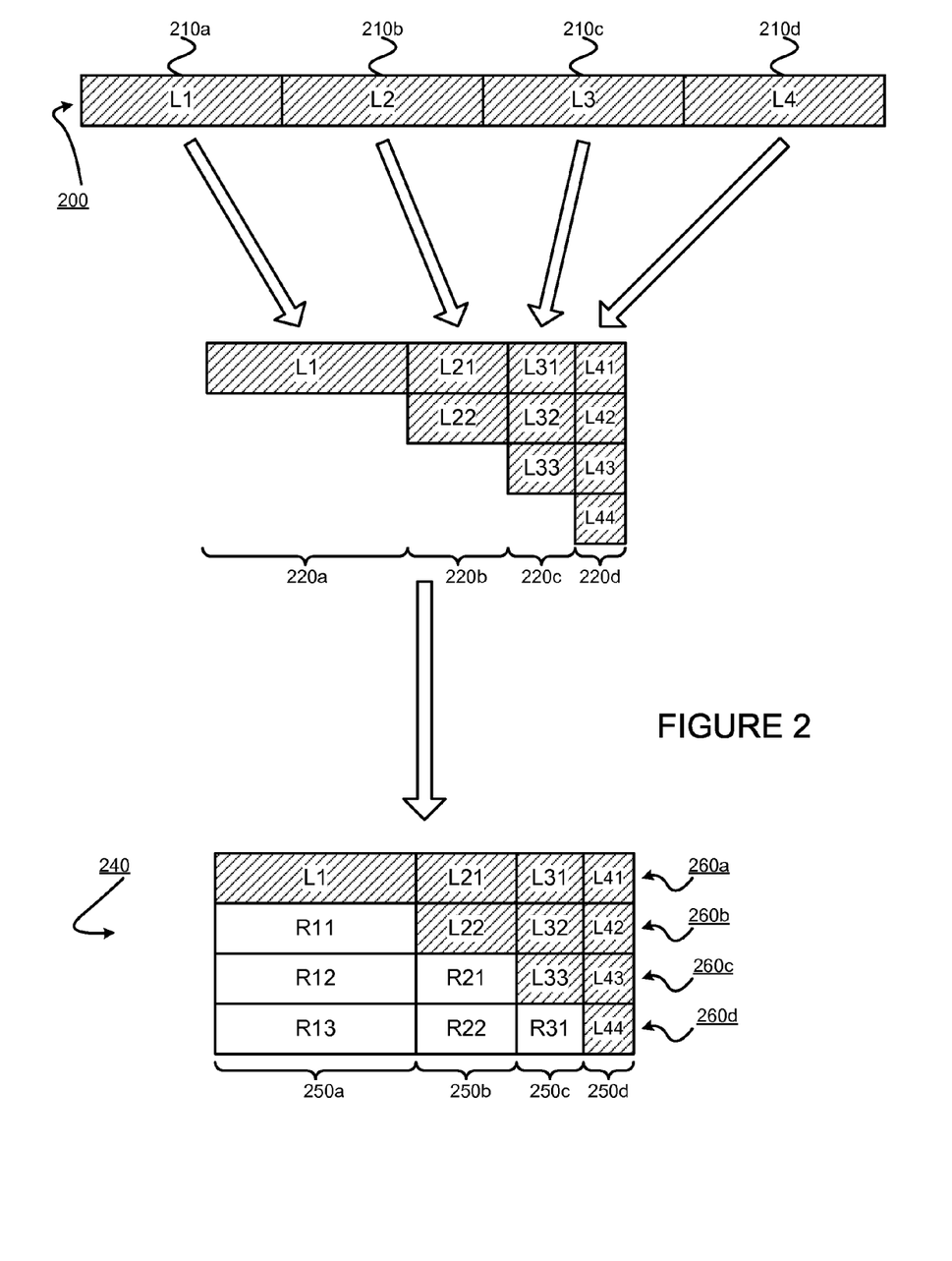
FIG. 2 is used to explain MD-FEC coding.

MD-FEC coding is explained with reference to FIG. 2. As shown at the top of FIG. 2, the original scalable bitstream 200 from each group of frames ("GOF") is partitioned into M (M=4 in the example) layers 210a-210d. The bitrate of layer k is defined as $R_k$. For k=1, ..., M, the k layer is divided into k equal-length groups. Thus, as shown, layer L1 includes one (1) group 220a, layer L2 includes two (2) equal-length groups 220b, layer L3 includes three (3) equal-length groups 220c, and layer L4 includes four (4) equal-length groups 220d. An (M,k) forward error correction code (e.g., the Reed-Solomon (RS) code) is then applied to k groups to yield M groups, 250a-250d denoted by m. Each of the plurality of descriptions 260a-260d is formed by packing bits from a corresponding group m from all layers k.

At the receiving peer, if any m descriptions (of the total M descriptions) 260a-260d are received, the decoder can recover the first m layers of the original bitstream 200. Therefore, if any one of the four descriptions 260a-260d is received, L1 210a of the original bitstream 200 can be recovered, if any two of the four descriptions 260a-260d are received, L1 210a and L2 210b of the original bitstream 200 can be recovered, if any three of the four descriptions 260a-260d are received, L1 210a, L2 210b and L3 210c of the original bitstream 200 can be recovered, and if the four descriptions 260a-260d are received, L1 210a, L2 210b, L3 210c and L4 210d can be recovered.

Note that for purposes of decoding a video stream, the first layer L1 is the most important, the second layer L2 is the next most important, the third layer L3 is the next most important, and the last layer L4 is the least important. Thus, the receiving peer distortion for MD-FEC can be controlled by varying the layer partition. By using fine granularity stream, the optimal layer partition has been proposed in the Puri article. With the optimal layer partition, the layer partition is adapted to the distribution of received descriptions to maximize the average received video quality, subject to a constraint on the total rate of all MD-FEC descriptions.

Although the foregoing example described MD-FEC with respect to four layers and four descriptions, different numbers of layers (and consequently different numbers of descriptions) can be used in a manner consistent with the present invention.

Figure 3:
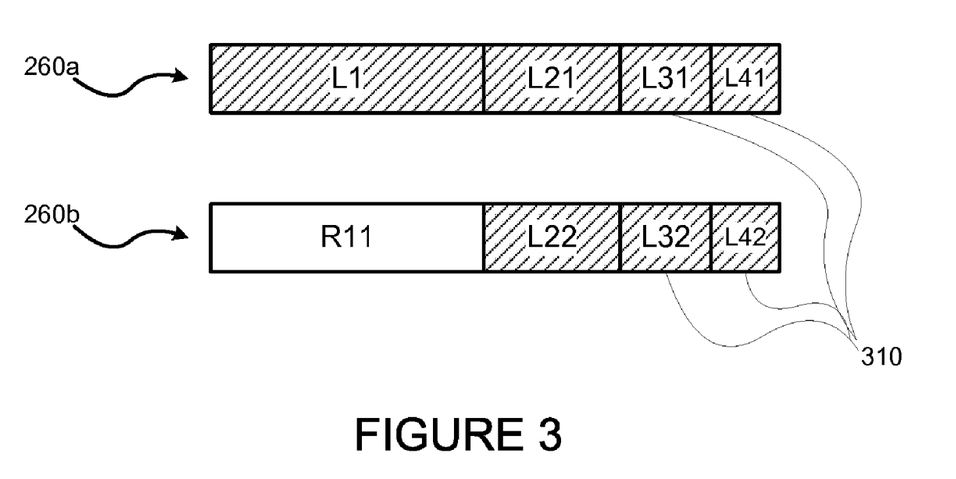
FIG. 3 illustrates the transmission of unhelpful bits when MD-FEC coding is used.

To make each description 260a-260d have equal importance in MD-FEC, redundant bits are transmitted. Unfortunately, as observed by the present inventors, some unhelpful bits are also transmitted. Referring to FIG. 3 for example, when M=4, and only two descriptions 260a and 260b are available to a receiving peer, the descriptions include unhelpful bits 310. More specifically, since only layers L1 and L2 of the original bitstream will be decoded at the receiving peer, the information related to layers L3 and L4 is not useful. The present inventors have used this observation in order to transmit information of (or derived from) the original bitstream 200 more efficiently.

§2. SUMMARY OF THE INVENTION

The objective of MDC in P2P video streaming is to handle sudden peer failures rather than to combat packet losses. Indeed, in most P2P video streaming systems, video data is transmitted by the transmission control protocol (TCP). (See, e.g., the articles, X. Hei, C. Liang, Y. Liu, and K. W. Ross, "Insights into PPLive: A measurement study of a large-scale P2P IPTV system," *Workshop on Internet Protocol TV(IPTV) services over World Wide Web*, Edinburgh, Scotland, May 2006 (incorporated herein by reference), and X. Zhang, J. Liu, B. Li, and P. Yum, "DONet: A data-driven overlay network for efficient live media streaming," *Proc. Of IEEE INFOCOM*, 2005 (incorporated herein by reference).) Therefore, packet loss can be handled efficiently by retransmission and buffering. Based on this observation, the present inventors have concluded that it is unnecessary to always transmit all redundancy bits (or all bits of a description) (since, as stated above, in the absence of transmission loss, MD-FEC does not utilize transmission bandwidth efficiently). In at least some embodiments consistent with the present invention, in P2P video streaming, it is feasible for a receiving peer to report the number of available descriptions to all of its supplying peers (or to report when this number changes). Based on this feedback, the supplying peers can cooperatively select which portion of data to deliver. Similar to MD-FEC, with embodiments consistent with the present invention, video quality gracefully degrades as descriptions are lost, independently of which particular descriptions are lost. However, the bits transmitted for a description from a supplying peer are adapted to the number of descriptions available at the receiving peer and no unnecessary bits are (or need be) sent.

§4. DETAILED DESCRIPTION

Exemplary methods for performing operations consistent with the present invention are described in §4.1. Then, exemplary apparatus for performing various operations and generating and/or storing various information in a manner consistent with the present invention are described in §4.2. Thereafter, an example illustrating exemplary operations in an exemplary embodiment consistent with the present invention is provided in §4.3. Refinements, alternatives and extensions are described in §4.4. Finally, some conclusions about such exemplary embodiments are provided in §4.5.

§4.1 Exemplary Methods

Figure 4:
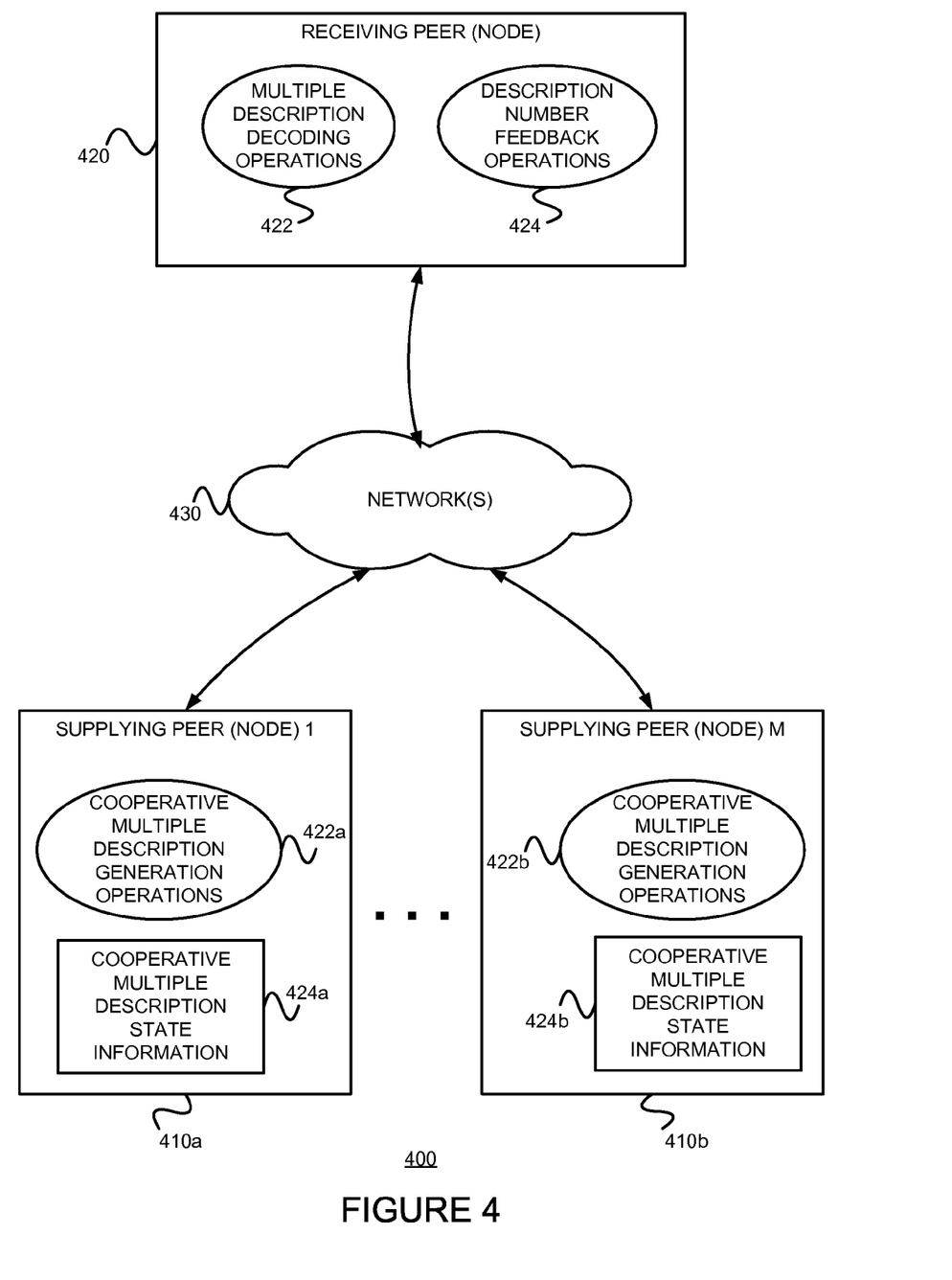
FIG. 4 is an exemplary environment in which exemplary embodiments consistent with the present invention may be used.

FIG. 4 is an exemplary environment 400 in which exemplary embodiments consistent with the present invention may be used. The environment 400 includes a plurality of supplying peers 410 and a receiving peer 420 which may communicate with one another via one or more networks 430. The peers 410, 420 can be employed in nodes such as desktop computers, laptop computers, personal digital assistants, mobile telephones, other mobile devices, servers, etc. They can even be employed in nodes that might not have a video display screen, such as routers, modems, set top boxes, etc.

The receiving peer 420 may include multiple description decoding operations 422 and description number feedback operations 424. Each of the supplying peers 410 may include a cooperative multiple description generation operations 422 which use and/or maintain cooperative multiple description state information 424. The network(s) 430 may include one or more networks, such as the Internet, local area (e.g., wireless) networks, service provider (e.g., telecom) networks, communications lines or channels, etc.

Figure 5:
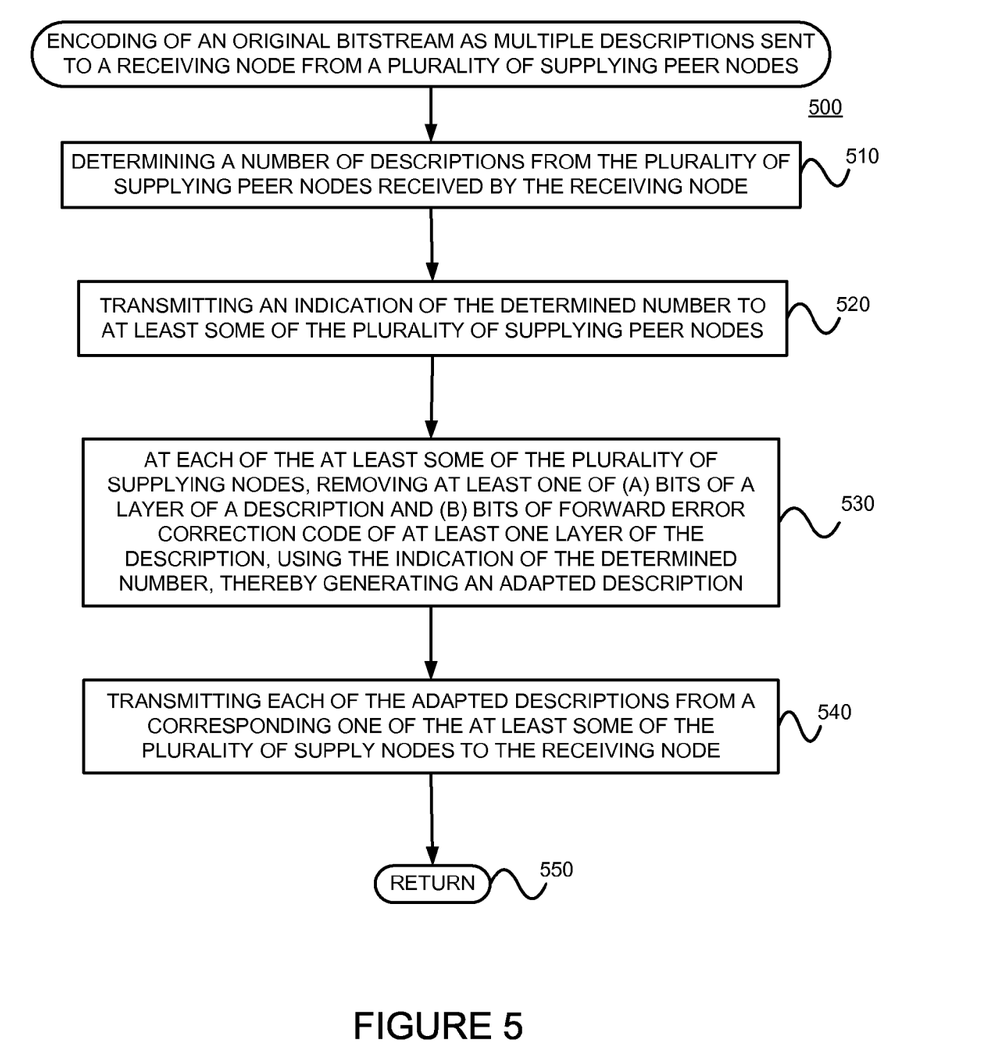
FIG. 5 is a flow diagram of an exemplary method for encoding an original bitstream as multiple descriptions sent to a receiving peer (node) from a plurality of supplying peers (nodes).

FIG. 5 is a flow diagram of an exemplary method 500 for encoding an original bitstream as multiple descriptions sent to a receiving peer (node) from a plurality of supplying peers (nodes). A number of descriptions from the plurality of supplying peer nodes received by the receiving node is determined. (Block 510). An indication of the determined number is then transmitted to at least some of the plurality of supplying peer nodes. (Block 520) At each of at least some of the plurality of supplying nodes, bits of a layer of a description and/or bits of forward error correction code of at least one layer of the description, are removed using the indication of the determined number, thereby generating an adapted description. (Block 530) Each of the adapted descriptions from a corresponding one of the supply nodes is then transmitted to the receiving node. (Block 540) The method 500 is then left. (Node 550) Although not shown, the adapted multiple descriptions received by the receiving peer (node) may then be decoded (e.g., for purposes of rendering the decoded video).

Referring back to blocks 510 and 520, these acts may be performed by description number feedback operations 424 of receiving peer (node) 420. The indication of the determined number of descriptions provided by the supplying peer (nodes) 410 may be an absolute number, a number of descriptions lost, or a signal indicating each time a description is lost.

In any event, each of the supplying peer (nodes) 410 can determine the number of descriptions received by the receiving peer (node) 420.

Referring back block 530, various exemplary ways, consistent with the present invention, that the supplying peer (nodes) 410 can adapt their corresponding descriptions are described later. The supplying peers 410 act cooperatively. The way in which they are to cooperate under various scenarios may be predetermined, or prearranged among the supplying peers 410. Alternatively, or in addition, the way in which they are to cooperate under various scenarios may be determined as needed (e.g., by a negotiation protocol between the serving peers, by a master serving peer or a central control node, etc.).

Figure 6:
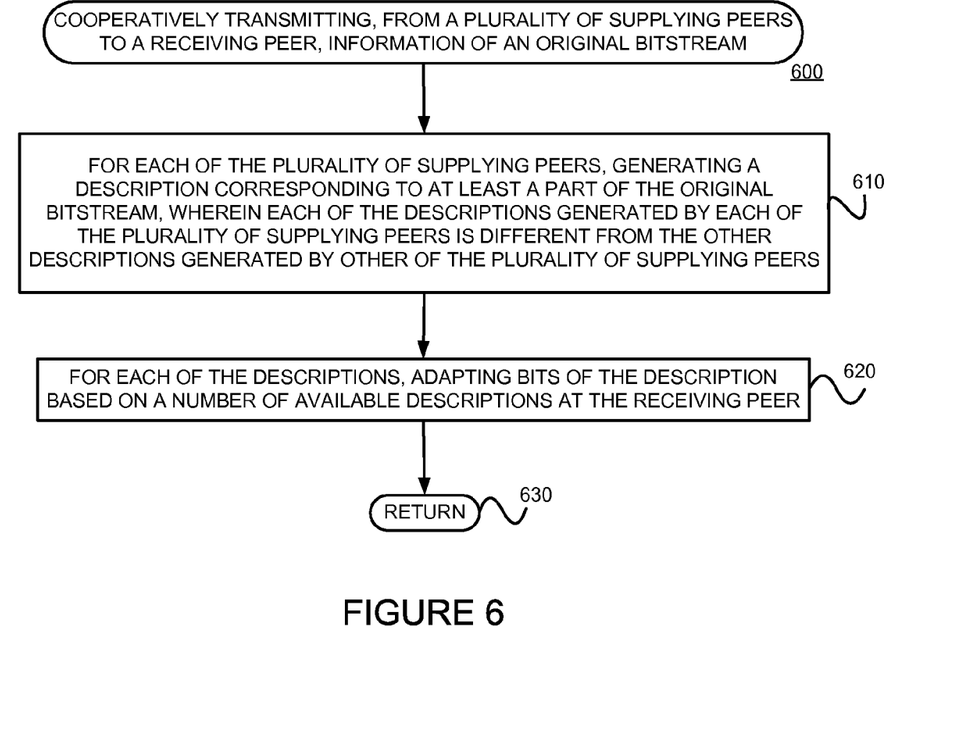
FIG. 6 is a flow diagram of an exemplary method for cooperative transmitting an original bitstream, as multiple descriptions, from a plurality of supplying peers (nodes) to a receiving peer (node).

FIG. 6 is a flow diagram of an exemplary method 600 for encoding an original bitstream as multiple descriptions sent to a receiving peer (node) from a plurality of supplying peers (nodes). For each of the plurality of supplying peers, a description corresponding to at least a part of the original bitstream is generated, wherein each of the descriptions generated by each of the plurality of supplying peers is different from the other descriptions generated by other of the plurality of supplying peers. (Block 610) Further, for each of the descriptions, bits of the description are adapted based on a number of available descriptions at the receiving peer. (Block 620) The method 600 is then left. (Node 630)

Figure 7:
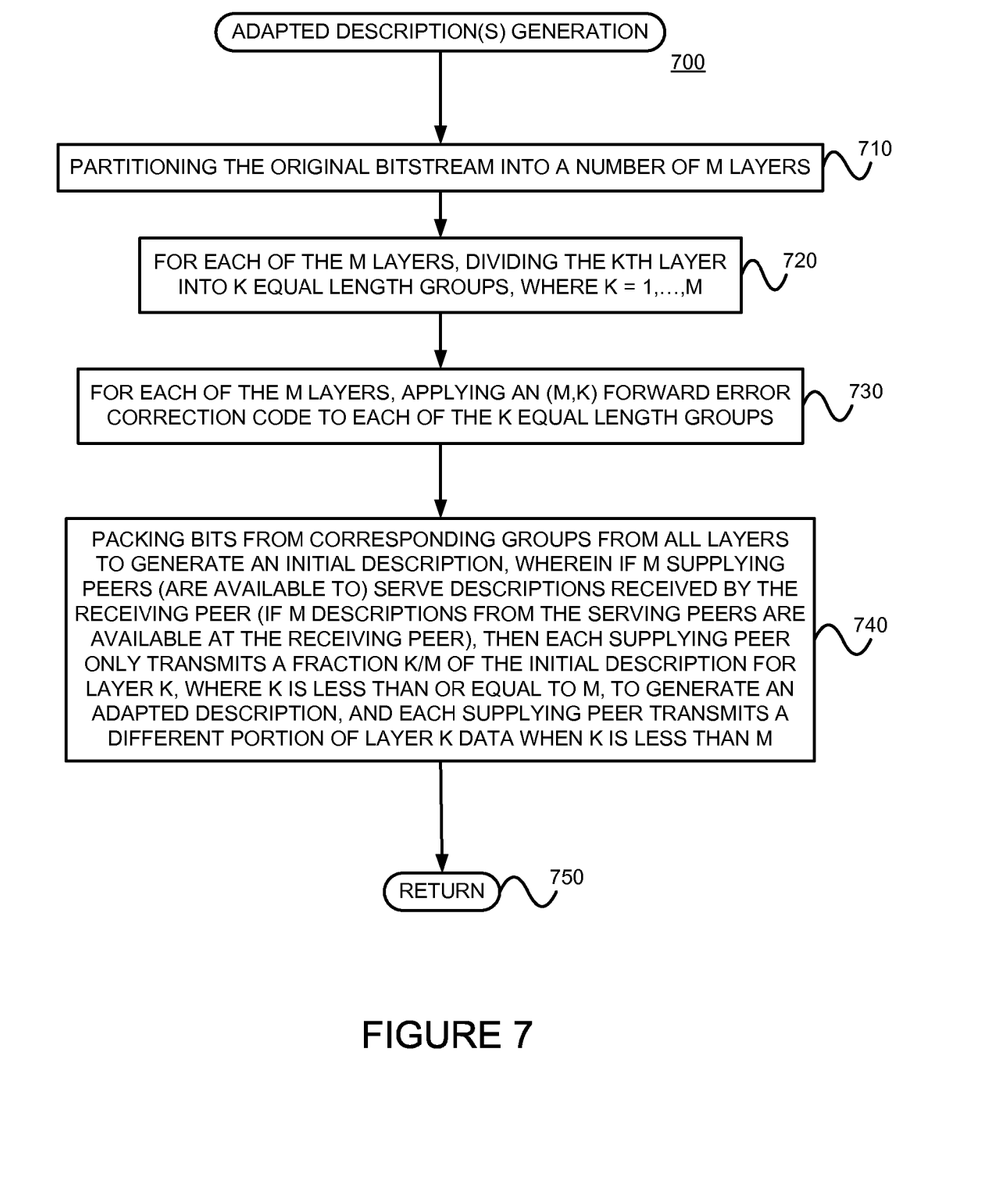
FIG. 7 is a flow diagram of an exemplary method for generating each of the adapted descriptions.

Referring back to blocks 530 and 620, in at least some embodiments consistent with the present invention, a total size of all of the adapted descriptions is no more than a size of the original bitstream from which the multiple-descriptions were encoded. In at least some embodiments consistent with the present invention, each of the adapted descriptions may be generated as illustrated by exemplary method 700. First, the original bitstream is partitioned into a number (M) of layers. (Block 710) For each of the M layers, the $k^{th}$ layer is divided into k equal length groups, where k=1, . . . , M. (Block 720) Further, for each of the M layers, an (M,k) forward error correction code (e.g., the Reed-Solomon code) is applied to each of the k equal length groups. (Block 730) Then, bits from corresponding groups from all layers are packed to generate an initial description, wherein if m supplying peers (are available to) serve descriptions received by the receiving peer (or if m descriptions from the serving peers are available at the receiving peer), then each supplying peer only transmits a fraction k/m of the initial description for layer k, where k is less than or equal to m, to generate an adapted description. (Block 740) Each supplying peer transmits a different portion of layer k data when k is less than m.

In at least some embodiments consistent with the present invention, the bitstream is a video data stream in which, for each of the M layers, the $k^{th}$ layer is more useful in decoding the video data stream than the $(k+1)^{th}$ layer.

In at least some embodiments consistent with the claimed invention, each of the adapted descriptions has the same number of bits as any other adapted descriptions.

In at least some embodiments consistent with the present invention, if m supplying peers (are available to) serve descriptions received by the receiving peer (or if m descriptions from the serving peers are available at the receiving peer), then each supplying peer only transmits a fraction k/m of the data for layer k, where k is less than or equal to m, and each supplying peer transmits a different portion of layer k data when k is less than m.

The amount of bits that are transmitted should adapt to the number of available descriptions. For example, under the P2P scenario, when a supplying peer disconnects, the receiving peer can detect it quickly and then instruct the remaining supplying peers, via feedback, to adjust their transmissions.

Embodiments described above use traditional MD-FEC coding. However, unlike the traditional MD-FEC which transmits all bits of a description, these embodiments adaptively transmit a portion of the bits of each description. For example, MD-FEC coding may be used to generate M descriptions, each of which is stored in a selected number of peers. If m supplying peers are available, each with a different description, then each supplying peer only transmits a fraction k/m of the data for layer k, where k=1, . . . , m, and each supplying peer transmits a different portion of layer k data. The receiving peer combines the received m substreams and obtains layer k (k=1, . . . , m) by (M,k) FEC decoding. In this way, the lowest m layers (that is, the m most important layers) are recovered.

§4.2 Exemplary Apparatus

Figure 8:
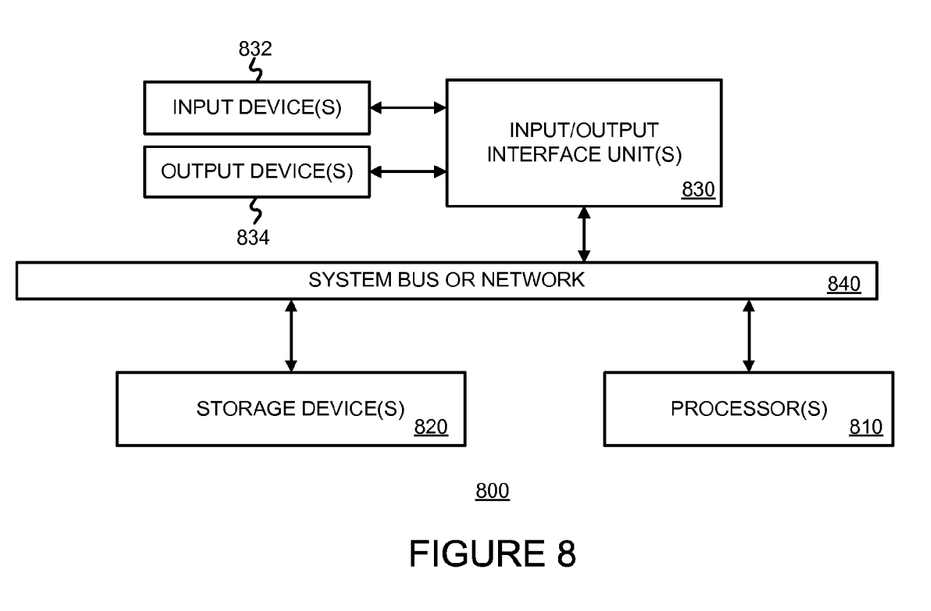
FIG. 8 illustrates exemplary apparatus for performing various operations and generating and/or storing various information in a manner consistent with the present invention.

FIG. 8 is a block diagram of apparatus 800 that may be used to perform at least some operations, and store at least some information, in a manner consistent with the present invention. The apparatus 800 includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830.

The one or more processors 810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. For example, one or more software modules, when executed by a processor, may be used to perform one or more of the operations and/or methods of FIGS. 4-7. At least a portion of the machine executable instructions may be stored (temporarily or more permanently) on the one or more storage devices 820 and/or may be received from an external source via one or more input interface units 830.

In one embodiment, the machine 800 may be one or more conventional personal computers or servers. In this case, the processing units 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface. In addition to (or instead of) the monitor, the personal computer may include other (peripheral) output devices (not shown), such as speakers and printers for example.

The operations of receiving peers (120, 420) and/or supplying peers (110, 410), such as those described above, may be performed on one or more computers. Such computers may communicate with each other via one or more networks, such as the Internet for example. Referring back to FIG. 1 for example, the various operations and information may be embodied by one or more machines 810. The peers 110, 120, 410, 420 can be employed in nodes such as desktop computers, laptop computers, personal digital assistants, mobile telephones, other mobile devices, servers, etc. They can even be employed in nodes that might not have a video display screen, such as routers, modems, set top boxes, etc.

Alternatively, or in addition, the various operations and acts described above may be implemented in hardware (e.g., integrated circuits, application specific integrated circuits (ASICs), field programmable gate or logic arrays (FPGAs), etc.).

§4.3 Example of Operations of an Exemplary Embodiment Consistent with the Present Invention FIGS. 9A-9D illustrate an example of operations of an exemplary embodiment consistent with the present invention. Unhelpful bits are shown with cross-hatching and are not transmitted. Referring back to FIG. 2, 240 illustrates descriptions using the known technique of MD-FEC coding, where the four descriptions are not adapted based on the number of descriptions available at the receiving peer (or the number of serving peers available to serve descriptions).

Figure 9A:
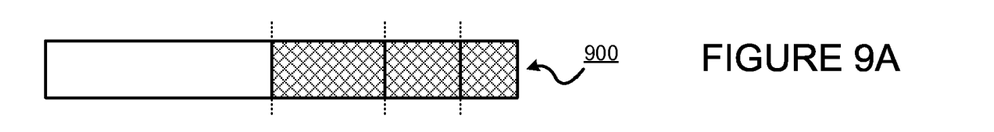
FIGS. 9A-9D illustrate an example of operations of an exemplary embodiment consistent with the present invention

FIG. 9A illustrates the description 900 transmitted if only one serving peer is available to transmit descriptions to the receiving peer. In this example, all of L1 (or R11, or R12, or R13) is provided, but information about the rest of the layers is not provided. In this way, the most important layer (L1) is provided, but since none of the other layers can be successfully decoded using only one of the four descriptions, no bits pertaining to these layers are transmitted (since such bits are unhelpful).

Figure 9B:
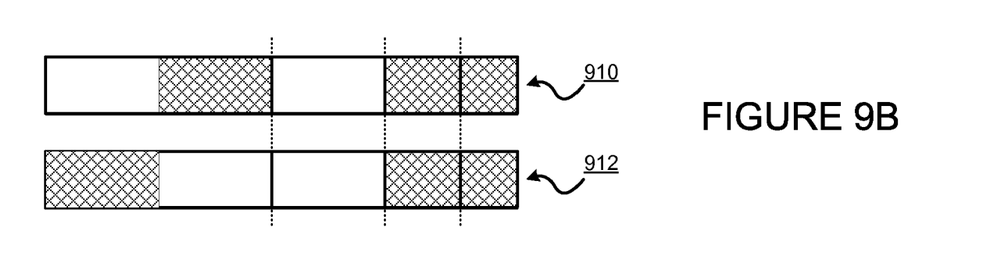

FIG. 9B illustrates the descriptions 910,912 transmitted if only two serving peers are available to transmit descriptions to the receiving peer. In this example, half of L1 (or R11, or R12, or R13) and all of L21 (or L22, or R21, or R22) is provided in one of the two descriptions and the other half of L1 (or R11, or R12, or R13) and all of L21 (or L22, or R21, or R22) is provided in the other of the two descriptions. In this example, for the first and second layers, the serving peers coordinate such that one of the descriptions will have L21 or R21, while the other description will have L22 or R22. In this way, the two most important layers—L1 and L2—can be decoded. Since, however, neither L3 nor L4 can be successfully decoded using only two of the four descriptions, no bits pertaining to these layers are transmitted (since such bits are unhelpful). Further, no unhelpful bits for layer L1 are transmitted.

Figure 9C:
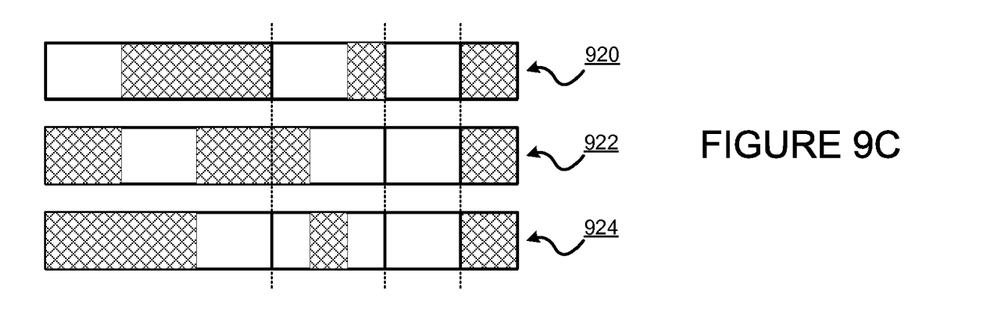

FIG. 9C illustrates the descriptions 920,922,924 transmitted if only three serving peers are available to transmit descriptions to the receiving peer. In this example, one third of L1 (or R11, or R12, or R13), two-thirds of L21 (or L22, or R21, or R22), and all of L31 (or L32, or L33 of R31) are provided in each of the three descriptions. In this example, for the first, second and third layers, the serving peers coordinate such that two of the three descriptions will have L21 or R21 collectively, and two of the three descriptions will have L22 or R22 collectively. Similarly, one of the three descriptions will have either L31 or R31, while the other two of the three descriptions will have L32 and L33. In this way, the three most important layers—L1, L2 and L3—can be decoded. Since, however, L4 cannot be successfully decoded using only three of the four descriptions, no bits pertaining to this layer are transmitted (since such bits would be unhelpful). Further, no unhelpful bits for layers L1 and L2 are transmitted.

Figure 9D:
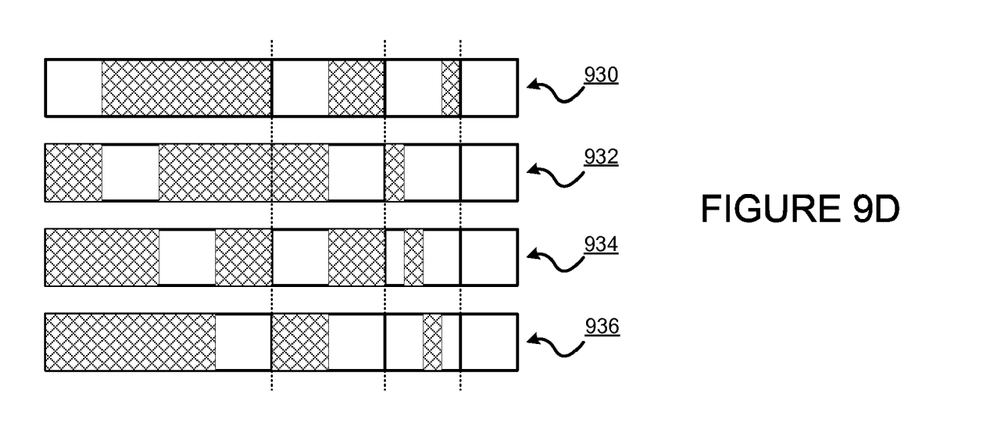

Finally, FIG. 9D illustrates the descriptions 930,932,934, 936 transmitted if all four serving peers are available to transmit descriptions to the receiving peer. In this example, one fourth of L1 (or R11, or R12, or R13), one half of L21 (or L22, or R21, or R22), three-fourths of L31 (or L32, or L33 of R31), and all of L41 (or L42, or L43, or L44) are provided in each of the four descriptions. In this example, for all of the four layers, the serving peers coordinate such that two of the four descriptions will have L21 or R21 collectively, and two of the four descriptions will have L22 or R22 collectively. Similarly, the four descriptions will have, collectively, L31 or R31, as well as L32 and L33. Further, each of the four descriptions will have one of L41, L42, L43 and L44. In this way, all four layers—L1 through L4—can be decoded. Further, no unhelpful bits pertaining to layers L1, L2 and L3 are transmitted.

Although this example illustrated an exemplary embodiment in the context of four layers in four descriptions, embodiments consistent with the present invention can be used with different numbers of layers and descriptions.

§4.4 Refinements, Alternatives and Extensions

Some embodiments consistent with the present invention use equal rate partitioning. With equal rate partitioning, before MD-FEC coding, the scalable video is partitioned into M layers with equal rates, $R_1 = R_2 = \ldots = R_M = R$. This partition method is simple, and has the added benefit that when used in the context of the present invention, the transmission rate R of each adapted description is always constant. Hence, the average bandwidth saving ratio can be expressed as:

$$r = 1 - \frac{\sum_{m=0}^{M} P(m)mR}{\sum_{m=0}^{M} P(m)mR_{MD\text{-}FEC}} = 1 - \frac{R}{R_{MD\text{-}FEC}}$$

where $R_{MD\text{-}FEC}$ is the transmission rate of one description with MD-FEC. Note that r is independent of P(m) when equal layer partition is applied.

Other embodiments consistent with the present invention use optimal rate partitioning. The optimal layer partition proposed in the Puri article is based on the Rate-Distortion (RD) characteristics of the encoded scalable video. When M is small, although the redundancy may not be enough to handle the network condition, the amount of redundancy that can be inserted is limited. In the extreme case, when M=1, no redundancy can be added to the bit stream. Therefore, the bandwidth saving of such embodiments is limited. When a moderate M is chosen, such as M=4 or M=8, MD-FEC conservatively adds more redundancy to guarantee that the lowest layers can be received, so more redundancy is added. Hence, more bandwidth is saved by using such embodiments. When M is large, such as M=16 or M=32, the layer partition can be performed more accurately depending on the network condition, such that the efficiency of MD-FEC is improved. Hence the bandwidth saving by such embodiments decreases. When the network condition is poor (p is small), with MD-FEC, more redundancy is added to the bitstream. Unlike MD-FEC, such embodiments do not have to transmit redundancy bits. Thus, the bandwidth saving increases as p decreases. Note that even with a large M (M=32) and a good channel condition (p=0.9), the bandwidth saving was found to be about 18% in simulations. In the case of M=8 and p=0.6, simulations have shown that such embodiments provide a bandwidth saving of more than 60%.

Although some embodiments were described above in the context of a P2P Video on Demand ("VoD") system, the present invention can be extended to other P2P video streaming overlays which also apply MD-FEC.

§4.5 Conclusions

Embodiments consistent with the present invention can significantly reduce the transmission bandwidth compared to MD-FEC. In evaluating an embodiment consistent with the present invention in comparison with MD-FEC based on a mesh-based P2P VoD system proposed in the Xu article, it was found that such an embodiment significantly reduces the consumed bandwidth compared to MD-FEC (up to 60%), so that given the total uplink bandwidth, more video sessions can be accommodated. The bandwidth saving is desirable, since the saved bandwidth can be used to accommodate more video sessions and/or can be used by the other applications of the peers.

Even if embodiments consistent with the present invention can potentially lose robustness in the event of packet losses, such packet losses can be more efficiently handled by retransmission and buffering at the receiving peer. In fact, all the presently popular P2P streaming systems employ TCP for bit stream delivery.

When the number of available descriptions at a receiving peer changes, the receiving peer instructs the remaining supplying peers, so that the supplying peers can adapt the portions of the descriptions to be sent. Since all operations and interactions can be performed locally between a receiving peer and its supplying peers, the overhead introduced is relatively low.

What is claimed is:

1. A method for controlling the encoding of an original bitstream as multiple-descriptions sent to a receiving node from a plurality of supplying peer nodes, the method comprising:
    a) determining a number of descriptions sent to the receiving node from the plurality of supplying peer nodes and received by the receiving node;
    b) transmitting an indication of the determined number to at least some of the plurality of supplying peer nodes; and
    c) at each of the at least some of the plurality of supplying nodes, adapting at least one of (A) bits of a layer of a description and (B) bits of forward error correction code of at least one layer of the description, using the indication of the determined number, thereby generating an adapted description.

2. The method of claim 1 further comprising:
    d) transmitting each of the adapted descriptions from a corresponding one of the at least some of the plurality of supply nodes to the receiving node.

3. The method of claim 1 wherein a total size of all of the adapted descriptions is no more than a size of the original bitstream from which the multiple-descriptions were encoded.

4. The method of claim 1 wherein each of the adapted descriptions is generated by
    partitioning the original bitstream into a number of M layers,
    for each of the M layers, dividing the $k^{th}$ layer into k equal length groups, where k=1, . . . , M,
    for each of the M layers, applying an (M,k) forward error correction code to each of the k equal length groups, and
    packing bits from corresponding groups from all layers to generate an initial description, wherein if m supplying peers are available to serve descriptions received by the receiving peer, then each supplying peer only transmits a fraction k/m of the initial description for layer k, where k is less than or equal to m, to generate an adapted description, and each supplying peer transmits a different portion of layer k data when k is less than m.

5. The method of claim 4 wherein the data stream is a video data stream, and wherein for each of the M layers, the $k^{th}$ layer is more useful in decoding the video data stream than the $(k+1)^{th}$ layer.

6. The method of claim 1 wherein each of the adapted descriptions is generated by
    partitioning the original bitstream into a number of M layers,
    for each of the M layers, dividing the $k^{th}$ layer into k equal length groups, where k=1, . . . , M,
    for each of the M layers, applying an (M,k) forward error correction code to each of the k equal length groups, and
    packing bits from corresponding groups from all layers to generate an initial description, wherein if m descriptions from the serving peers are available at the receiving peer, then each supplying peer only transmits a fraction k/m of the initial description for layer k, where k is less than or equal to m, to generate an adapted description, and each supplying peer transmits a different portion of layer k data when k is less than m.

7. The method of claim 6 wherein the original bitstream is a video data stream, and wherein for each of the M layers, the $k^{th}$ layer is more useful in decoding the video data stream than the $(k+1)^{th}$ layer.

8. The method of claim 1 wherein the forward error correction code is Reed-Solomon.

9. The method of claim 1 wherein each of the adapted descriptions has the same number of bits as any other adapted descriptions.

10. A method for cooperatively transmitting, from a plurality of supplying peers to a receiving peer, information of an original bitstream, the method comprising:
    a) for each of the plurality of supplying peers cooperatively transmitting information of the original bitstream to the receiving peer, generating a description corresponding to at least a part of the original bitstream, wherein each of the descriptions generated by each of the plurality of supplying peers is different from the other descriptions generated by other of the plurality of supplying peers; and
    b) for each of the descriptions, adapting bits of the description based on a number of available descriptions at the receiving peer.

11. The method of claim 10 wherein each of the descriptions is generated by
    partitioning the original bitstream into a number of M layers,
    for each of the M layers, dividing the $k^{th}$ layer into k equal length groups, where k=1, . . . , M,
    for each of the M layers, applying an (M,k) forward error correction code to each of the k equal length groups, and
    packing bits from corresponding groups from all layers to generate the description.

12. The method of claim 11 wherein the (M,k) forward error correction code is (M,k) Reed-Solomon code.

13. The method of claim 11 wherein the original bitstream is a video data stream, and wherein for each of the M layers, the $k^{th}$ layer is more useful in decoding the video data stream than the $(k+1)^{th}$ layer.

14. The method of claim 11 wherein if m supplying peers are available to serve descriptions received by the receiving peer, then each supplying peer only transmits a fraction k/m of the data for layer k, where k is less than or equal to m, and each supplying peer transmits a different portion of layer k data when k is less than m.

15. The method of claim 11 wherein if m descriptions from the serving peers are available at the receiving peer, then each supplying peer only transmits a fraction k/m of the data for layer k, where k is less than or equal to m, and each supplying peer transmits a different portion of layer k data when k is less than m.

16. Apparatus comprising:
    a) at least one processor; and
    b) at least one storage device storing program instructions which, when executed by the at least one processor, perform a method for controlling the encoding of an original bitstream as multiple-descriptions sent to a receiving node from a plurality of supplying peer nodes, the method including
        1) determining a number of descriptions sent to the receiving node from the plurality of supplying peer nodes and received by the receiving node,
        2) transmitting an indication of the determined number to at least some of the plurality of supplying peer nodes, and
        3) at each of the at least some of the plurality of supplying nodes, adapting at least one of (A) bits of a layer of a description and (B) bits of forward error correction code of at least one layer of the description, using the indication of the determined number, thereby generating an adapted description.

17. The apparatus of claim 16 wherein each of the adapted descriptions is generated by
    partitioning the original bitstream into a number of M layers,
    for each of the M layers, dividing the $k^{th}$ layer into k equal length groups, where k=1, ..., M,
    for each of the M layers, applying an (M,k) forward error correction code to each of the k equal length groups, and
    packing bits from corresponding groups from all layers to generate an initial description, wherein if m supplying peers are available to serve descriptions received by the receiving peer, then each supplying peer only transmits a fraction k/m of the initial description for layer k, where k is less than or equal to m, to generate an adapted description, and each supplying peer transmits a different portion of layer k data when k is less than m.

18. The apparatus of claim 16 wherein each of the adapted descriptions is generated by
    partitioning the original bitstream into a number of M layers,
    for each of the M layers, dividing the $k^{th}$ layer into k equal length groups, where k=1, ..., M,
    for each of the M layers, applying an (M,k) forward error correction code to each of the k equal length groups, and
    packing bits from corresponding groups from all layers to generate an initial description, wherein if m descriptions from the serving peers are available at the receiving peer, then each supplying peer only transmits a fraction k/m of the initial description for layer k, where k is less than or equal to m, to generate an adapted description, and each supplying peer transmits a different portion of layer k data when k is less than m.

19. Apparatus comprising:
    a) at least one processor; and
    b) at least one storage device storing program instructions which, when executed by the at least one processor, perform a method for cooperatively transmitting, from a plurality of supplying peers to a receiving peer, information of an original bitstream, the method including
        1) for each of the plurality of supplying peers cooperatively transmitting information of the original bitstream to the receiving peer, generating a description corresponding to at least a part of the original bitstream, wherein each of the descriptions generated by each of the plurality of supplying peers is different from the other descriptions generated by other of the plurality of supplying peers; and
        2) for each of the descriptions, adapting bits of the description based on a number of available descriptions at the receiving peer.

20. The apparatus of claim 19 wherein each of the descriptions is generated by
    partitioning the original bitstream into a number of M layers,
    for each of the M layers, dividing the $k^{th}$ layer into k equal length groups, where k=1, ..., M,
    for each of the M layers, applying an (M,k) forward error correction code to each of the k equal length groups, and
    packing bits from corresponding groups from all layers to generate the description.

* * * * *